United States Patent [19]

Pavlak

[11] 3,859,812
[45] Jan. 14, 1975

[54] METHODS AND APPARATUS FOR TREATING MACHINE TOOL COOLANTS

[76] Inventor: Richard B. Pavlak, 4361 Plantation Trl., Bellbrook, Ohio 43305

[22] Filed: Mar. 8, 1974

[21] Appl. No.: 449,382

[52] U.S. Cl............................ 62/99, 62/98, 62/119, 62/201, 62/185, 62/333, 62/435, 62/DIG. 10, 62/228
[51] Int. Cl............................................ F25d 17/02
[58] Field of Search......... 62/201, 185, 98, 99, 119, 62/DIG. 10, 435, 333

[56] References Cited
UNITED STATES PATENTS

| | | |
|---|---|---|
| 1,712,567 | 5/1929 | Kritzer................................ 62/228 |
| 2,379,932 | 7/1945 | Schoepflin........................... 62/435 |
| 2,596,195 | 5/1952 | Arbuckle............................. 62/435 |
| 2,606,747 | 8/1952 | Williams.............................. 165/27 |
| 2,620,635 | 12/1952 | Inautner.............................. 62/185 |
| 3,748,866 | 7/1973 | Heeder................................ 62/99 |

Primary Examiner—William J. Wye
Attorney, Agent, or Firm—Robert L. Deddens

[57] ABSTRACT

Methods and apparatus for treating machine tool coolants include a system for cooling a fluid with a refrigerant and metering the fluid to a heat exchanger, whence the fluid cools the machine tool coolant. A modulating control valve is adapted to meter the fluid to the heat exchanger in response to the temperature of the machine tool coolant exiting from the heat exchanger.

8 Claims, 4 Drawing Figures

METHODS AND APPARATUS FOR TREATING MACHINE TOOL COOLANTS

BACKGROUND OF THE INVENTION

The present invention relates to methods and apparatus for treating machine tool coolants, and particularly for treating machine tool coolants subject to a relatively wide fluctuation in temperature upon exiting from the machine tool, and/or which require a relatively constant temperature when admitted to the machine tool. The invention also relates to methods and apparatus for treating machine tool coolants which exhibit a relatively wide temperature differential between the admitting temperature and the exiting temperature to and from the machine tool, respectively.

Treatment of such coolants is commonly accomplished by circulating the coolant from the machine tool through a heat exchange unit which is cooled by a circulating refrigerant, such as freon. In such systems, the coolant is brought into direct cooling relationship with the refrigerant within the heat exchanger. A number of problems have been noted with this type of cooling system.

It has been found that such a direct system is incapable of effectively controlling the temperature of the coolant delivered to the machine tool from the heat exchanger. This causes problems because variations in the coolant temperature can adversely affect the operation of the machine tool, particularly where close tolerances are important, because inconsistent machine tool coolant temperatures can cause inconsistent cutting operations.

There is also a substantial possibility that the refrigerant compressor will be damaged when a warm coolant is brought into direct contact with the refrigerant side of a heat exchanger. The damage occurs, particularly where there is a fluctuation in the temperature of the coolant returning from the machine tool, because the refrigerant compressor attempts to respond to the temperature fluctuation by increasing the density of the freon gas. This in turn requires an increase in horsepower demand from the compressor motor, which has been found to cause compressor motor failure. Such a system can cause considerable down-time for the machine tool, to repair the compressor motor or install a new one.

SUMMARY OF THE INVENTION

The present invention is directed to improved methods and apparatus for maintaining a relatively constant return temperature of coolant for a machine tool.

In general, the apparatus provides an intermediate heat transfer or cooling fluid which is cooled or treated by a refrigerant and is then selectively admitted to a heat exchanger for the purpose of cooling the fluid coolant being circulated through a machine tool. The apparatus of the invention provides for modulating the input flow of the intermediate cooling fluid to the heat exchanger in response to the temperature of the coolant exiting the heat exchanger, and assures that the temperature of the coolant exiting the heat exchanger is immediately and directly controlled as soon as a temperature variation occurs.

The apparatus of the invention also provides for elimination of unnecessary cycling of the refrigerant compressor, by utilizing a hot gas by-pass system to control the operation of the compressor at a relatively constant rate.

In accordance with a preferred embodiment of the invention, the apparatus incorporates a unitary structure supporting a series of three heat exchange units. In the first heat exchange unit, the intermediate cooling fluid (water) cools the fluid coolant being circulated through the machine tool. The second heat exchange unit utilizes a refrigerant, such as freon, which cools the intermediate cooling fluid prior to its delivery to the first heat exchange unit. The third heat exchange unit operates as a condensor of hot freon gas to form liquid freon which is delivered to the second heat exchange unit to cool the intermediate cooling fluid.

A three-way modulating control valve is located intermediate the first and second heat exchange units and is adapted to meter an amount of water to the first heat exchange unit in response to the output temperature of the coolant, in order that the output temperature of the coolant exiting from the first heat exchanger may be maintained at a substantially constant level. The modulating control valve by-passes the excess intermediate cooling fluid back through the intermediate cooling fluid system.

In addition, a hot gas by-pass system is provided intermediate the second and third heat exchange units and is adapted to meter an amount of hot freon gas to the second heat exchanger in response to the input temperature of intermediate cooling fluid thereto. The hot gas is metered into the liquid freon flowing into the second heat exchanger in a proportion sufficient to obtain a substantially constant operation of the refrigerant compressor.

The intermediate cooling fluid system provides an indirect relationship between the refrigerant and the machine tool coolant and provides an effective means for maintaining a finite temperature control over the fluid coolant returned to the machine tool. In addition, by utilizing the hot gas by-pass system, the life of the refrigerant compressor unit may be increased.

DESCRIPTION OF THE PREFERRED EMBODIMENT

Figure 1:
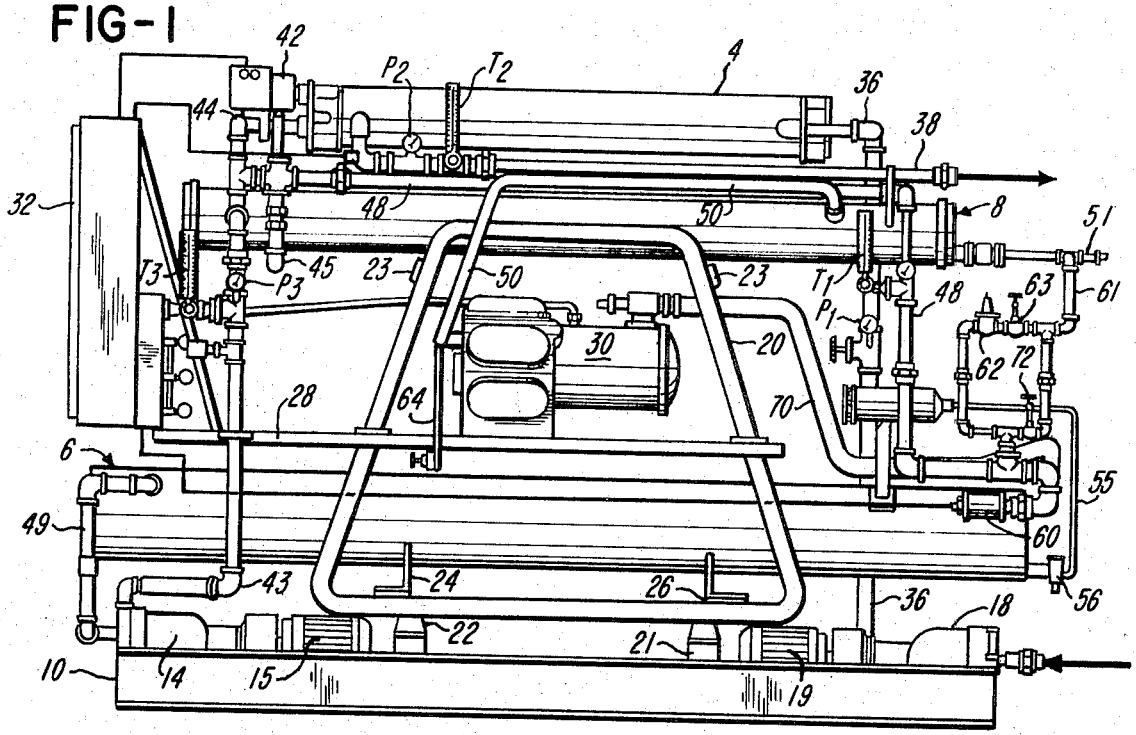
FIG. 1 is an elevational view showing one side of the apparatus constructed in accordance with the invention.
Figure 2:
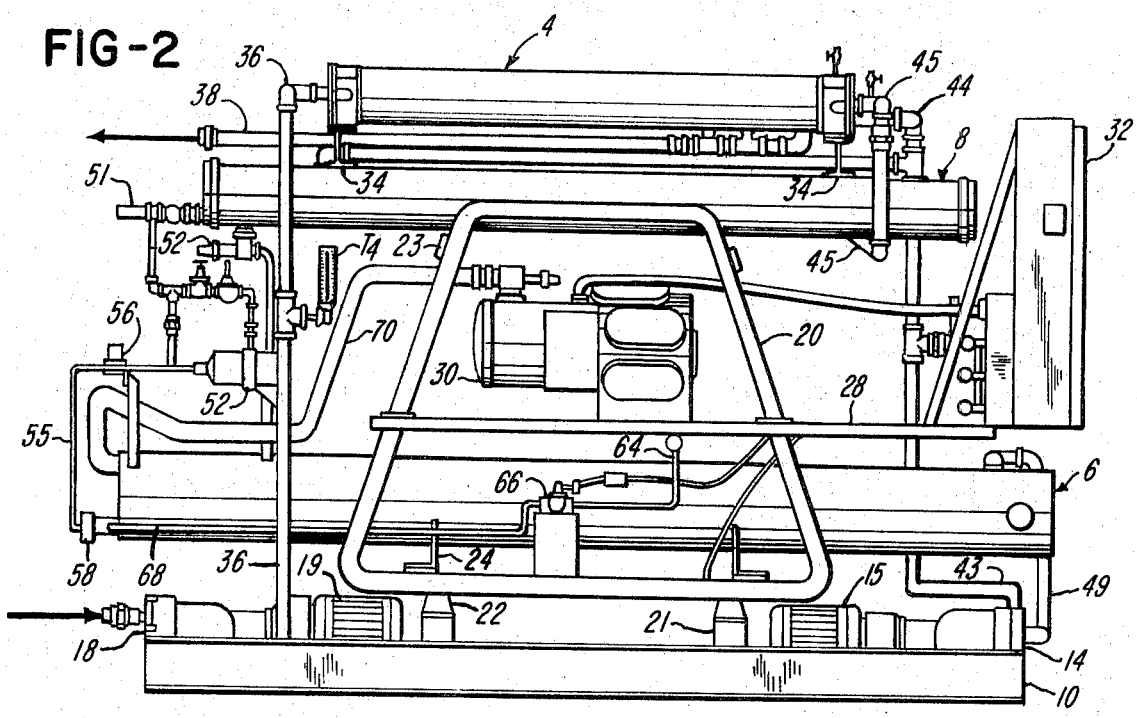
FIG. 2 is an elevational view of the opposite side of the apparatus shown in FIG. 1.
Figure 3:
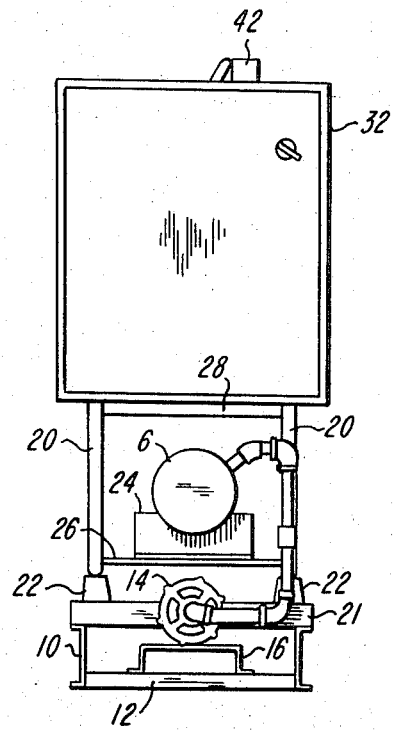
FIG. 3 is an end view of the apparatus of FIG. 1 taken along line 33 in FIG. 2.

Referring to FIGS. 1–3, the apparatus of the invention is shown as including first, second, and third heat exchange units 4, 6, and 8, respectively. These units are mounted on a unitary structure shown as including a pair of spaced-apart I-beams connected by a pair of transverse support members 12 (FIG. 3). A chilled water pump 14 and associated motor 15 are mounted on a platform 16 at one end of the apparatus, and a coolant pump 18 and associated motor 19 are similarly mounted on the opposite end of the apparatus.

A pair of generally O-shaped frame members 20 are supported vertically on either side of the apparatus by transverse support members 21 and mounting blocks 22, the support members 21 being welded to the I-beams 10. The frame members 20 are maintained in spaced-apart relation by the transverse arms (FIGS. 1 and 2) located just below the longitudinally extending third heat exchange unit 8. A pair of transverse brackets 24, mounted on cross members 26 welded to the bottom link of the frame members 20, support the second heat exchange unit 6 longitudinally of the apparatus.

In addition, a platform 28 is mounted on the frame members 20 and supports a refrigerant compressor unit 30 located centrally of the apparatus. The platform 28 also supports at one end of the apparatus the control panel 32. A pair of support members 34 (FIG. 2) are welded to the upper surface of the third heat exchange unit 8 and support the first heat exchange unit 4 thereabove.

The coolant pump 18 delivers coolant from a machine tool 35 (FIG. 4) generally vertically through a pipeline 36 to the first exchange unit 4. After passing through the unit 4, the coolant exits to pipeline 38 and is recirculated to the machine tool 35. In line 38 a temperature control sensor 40, operatively connected to the control panel 32, senses the exiting coolant temperature and relays the signal to the control panel 32. The control panel 32 then actuates a three-way modulating control valve 42 electrically, as discussed more fully below. The system contains a series of four thermometers and pressure gauges to enable the operator quickly to determine the temperatures and pressures throughout the system. These thermometers and pressure gauges are identified in the drawings as T1, T2, T3, T4 and P1, P2, P3, P4 respectively.

Simultaneously, the chilled water pump 14 circulates water vertically through pipeline 43 vertically to pipeline 44 which feeds the water directly into the first heat exchange unit 4. The chilled water exits from the unit 4 through line 45 to the three-way valve 42. The valve 42 is adapted to admit a metered portion of the water passing through line 42 and line 44 to the first heat exchange unit 4 and to by-pass the remaining portion of the water via a line 46 through the valve 42 to line 48, and thence to the heat exchange unit 6. When in full cooling position, the valve 42 will block any flow from line 46 to line 48 and all the chilled water from line 43 will be delivered to the unit 4 via line 44. On the other hand, when the valve 42 is in full by-pass position, the chilled water in line 43 will be diverted to the line 46 and passed directly through the valve 42 to the heat exchange unit 6. The coolant water exits from the unit 6 to a return line 49.

The refrigerant compressor unit 30 delivers compressed refrigerant gas (e.g.,freon) via line 50 (FIG. 1) to the third heat exchange unit 8. Line 51, for example connected to an ordinary water tap, delivers water to the unit 8 where the tap water cools the freon gas and condenses it to a liquid. The liquid freon refrigerant then drains from the unit 8 through a line 52 (FIG. 2) to a sight glass (not shown). Thereafter, the refrigerant passes through a line 55 containing a solenoid valve 56 controlling the flow of the refrigerant and operatively connected to the control panel 32. A thermal expansion valve 58, also in line 55, controls the admission of the refrigerant to the unit 6. A temperature control sensor 60 (FIGS. 1 & 4) in line 48, and operatively connected to the control panel 32, senses the temperature of the chilled water entering the unit 6 and electrically loads and unloads the compressor 30. Balance cocks 33 establish drain flow rates.

Figure 4:
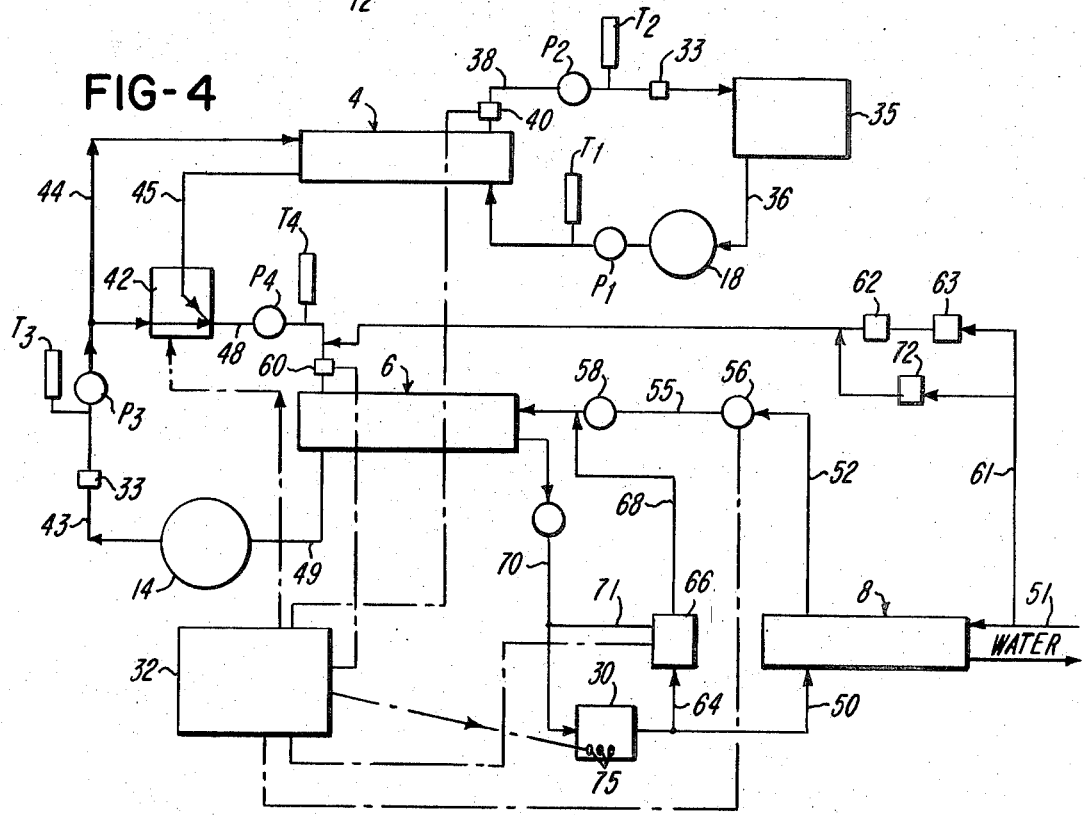
FIG. 4 is a schematic drawing showing the preferred apparatus for practicing the method of the present invention.

In the preferred embodiment of the invention, a water make-up line 61 includes a pressure regulator 62 and a valve 63 arranged to maintain a constant volume of water in the water circulating system. Where water is used as the cooling fluid for the condensor 8, the make-up line 61 is connected directly to the tap line 51 (FIGS. 1 and 4). It should be obvious, however, that the third heat exchange unit 8 could as well be cooled with other fluids, such as ambient air by utilizing an air cooled condensor and piping the hot gas from the compressor 30 to the condensor 8.

In accordance with the invention, a hot gas by-pass line 64 (FIG. 1) connected to the line 50 delivers compressed freon gas to a hot gas by-pass valve 66 (FIG. 2) operatively connected to the control panel 32. Valve 66 is adapted to bleed hot gas through line 68 (FIG. 2) in response to the suction pressure in the outlet line 70 of unit 6, sensed through line 71, to add hot freon gas to the liquid freon in line 55. In the preferred embodiment, the hot gas freon and the liquid freon are mixed within the line 55 just prior to delivery to the second heat exchange unit 6.

The apparatus hereinabove described is contemplated to operate continuously, as follows: First, to start the apparatus the water circulating system is filled by connecting line 51 to a water tap and opening a shut-off valve 72 (FIG. 1) in the water line 61. This admits water into line 48 and fills the heat exchange unit 6 and lines 43 and 44. The valve 72 is then closed and the valve 63 is opened, to place the water system under the control of the pressure regulator 62 in order that the system's pressure is maintained at a constant level automatically. Next, the water pump 14 is started and circulates water through the heat exchange unit 6. At this point the three-way valve 42 is in a completely closed position, to permit all the water to circulate through the system to the heat exchange unit 4 and to prevent water from being by-passed directly to the second heat exchange unit 6.

Simultaneously, the compressor 30 is started and delivers hot freon gas through line 50 to the third heat exchange unit 8. Since water is continuously passing through unit 8 via line 51, the hot freon gas cools and condenses and the liquid freon drains via line 52 to the second heat exchange unit 6. Upon delivery to the unit 6, the liquid freon expands and cools the water circulating to the same unit. The temperature control sensor 60 continuously senses the temperature of the water entering the unit 6, and relays a signal to the control panel 32. When the temperature of the water in line 48 reaches a pre-established level, the sensor 60 signals the control panel, which in turn actuates the electric solenoid valve 56 to unload the compressor cylinders 75 within the compressor 30. Hot gas by-pass valve 66 then opens when the last compressor cylinder 75 has been unloaded, and when the suction pressure in line 70 decreases to a predetermined level the hot gas by-pass valve 66 opens and permits freon gas to be delivered through line 68 to line 55, to be mixed in a varied and sufficient amount with the liquid freon prior to admission to the heat exchange unit 6. This process permits the compressor unit 30 to establish a substantially continuous operation without cycling.

At the same time, the coolant pump 18 is started and circulates coolant between the machine tool 35 and the first heat exchange unit 4. Once the machine tool 35 is started, heat is added to the coolant. The sensor 40, when the temperature reaches the pre-established level, signals the control panel which then actuates the three-way control valve 42 causing additional chilling waters to be directed through lines 43 and 44 to the first heat exchange unit 4. As mentioned above, the sensor 60 in line 48 monitors the temperature of the chilled water derived from line 46 and 48, and operates the compressor 30 in response thereto. This enables the temperature of the water exiting from the unit 6 to be varied in response to the load required by the heat exchanger 4, as determined by the temperature sensor 40, and this process enables a varied and sufficient amount of chilled water to be admitted to the unit 4 to maintain a substantially constant temperature of the coolant delivered to the machine tool 35.

By following the method as now described the temperature sensor 40, when it signals the control panel that the machine tool coolant temperature in line 38 is too low, causes the three-way control valve 40 to divert a portion of the chilled water through the valve to the heat exchange unit 6, thereby reducing the cooling effect of the water in line 44. On the other hand if it senses that the temperature is too high, the sensor 40 will cause the three-way valve to direct more of the chilled water in line 43 to be conveyed through line 44 and have a more significant cooling effect upon the coolant in line 38, thereby reducing the temperature of the coolant therein. This process will react automatically to maintain a substantially constant temperature in the line 38.

As can be seen from the foregoing description, the present invention provides a number of significant advantages. The refrigerant does not come in to direct cooling relationship with the coolant, but rather the water system interposed between the coolant system and the refrigerant system provides an indirect cooling relationship which enables the coolant to be maintained at a substantially constant temperature. By metering the volume of chilled water added to the first heat exchange unit, the present invention may be utilized for different machine tool operations which may produce different coolant output temperatures.

By modulating the chilled water in response to the output temperature of the coolant from the unit 4, the invention provides a very flexible tool for use in a large machine shop. For example, the apparatus of the invention might be connected to a cutting tool for one period of time at one output temperature and, at a later date to a punching tool at a different output temperature.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

I claim:

1. Apparatus for cooling a fluid coolant for a machine tool comprising a first heat exchange unit, means for circulating the fluid coolant between the machine tool and said first heat exchange unit, a second heat exchange unit, means for circulating a first heat transfer fluid between said first heat exchange unit and second heat exchange unit, a third heat exchange unit, means for circulating a second heat transfer fluid between said second heat exchange unit and said third heat exchange unit, and means for circulating a third heat transfer fluid through said third heat exchange unit, the third heat transfer fluid being effective to cool the second heat transfer fluid in said third heat exchange unit, the second heat transfer fluid being effective to cool the first heat transfer fluid in said second heat transfer unit, and the first heat transfer fluid being effective to cool the fluid coolant in the first heat exchange unit.

2. The apparatus of claim 1 further comprising means for selectively admitting the first heat transfer fluid to said first heat exchange unit in response to the temperature of the fluid coolant exiting from said first heat exchange unit.

3. The apparatus of claim 2 wherein said fluid admitting means comprises means for sensing the temperature of the fluid coolant exiting from said first heat exchange unit and a three-way modulating control valve responsive to said sensing means for controlling of the volume of the first heat transfer fluid admitted to said first heat exchange unit and for by-passing the remaining volume thereof to said second heat exchange unit, said admitting means being adapted to meter a volume of the first fluid to said first heat exchange unit sufficient to maintain the temperature of the fluid coolant exiting therefrom at a substantially constant level.

4. The apparatus of claim 1 wherein the second heat transfer fluid is a refrigerant, and further including compressing means intermediate said second and third heat exchange units for converting said refrigerant from a liquid to a hot gas, means for directing the refrigerant in the form of a hot gas to said third heat exchange unit, said third heat exchange unit being effective to condense the refrigerant to a liquid, means for directing said liquid refrigerant to said second heat exchange unit, and means for by-passing a portion of the refrigerant when in the form of a hot gas to the second heat exchange unit together with said liquid refrigerant to cause said compressing means to operate substantially continuously and significantly minimize the likelihood of compressing means failures.

5. Apparatus in combination with a machine tool for controlling the temperature of a fluid coolant used therein comprising a first heat exchange unit, means for circulating the fluid coolant between the machine tool and said first heat exchange unit, a second heat exchange unit, means for circulating a first heat transfer fluid between said first heat exchange unit and said second heat exchange unit, means for circulating a second heat transfer fluid through said second heat exchange unit to effect a cooling of said first heat transfer fluid therein, and means for selectively controlling the quantity of the first heat transfer fluid admitted to said first heat exchange unit in response to the temperature of the coolant exiting from said first heat exchange unit to control the temperature of the fluid coolant returned to the machine tool.

6. The apparatus of claim 5 wherein said fluid admitting means includes means for sensing the temperature of the fluid coolant exiting from said first heat exchange unit, and a modulating control valve between said first and second heat exchange units, said control valve being actuated in response to a change in the exiting temperature of the fluid coolant as detected by said sensing means, and said control valve being effective to control the admission of the first heat transfer fluid to said first heat exchange unit and to maintain a relatively constant temperature of fluid coolant exiting from said first heat exchange unit to said machine tool.

7. A method for cooling fluid machine tool coolants comprising the steps of circulating the fluid coolant between the machine tool and a first heat exchanger, circulating a refrigerant through a second heat exchanger, circulating an aqueous fluid between the second heat exchanger and the first heat exchanger to effect a cooling of the aqueous fluid in the second heat exchanger and a cooling of the fluid coolant in the first heat exchanger, sensing the temperature of the fluid coolant exiting from the first heat exchanger, and modulating the admission of the aqueous fluid to the first heat exchanger in response to changes in the temperature of the fluid coolant exiting from the first heat exchanger.

8. The method of claim 7 further comprising the steps of sensing the temperature of the aqueous fluid exiting from the second heat exchanger, and controlling the admission of refrigerant to the second heat exchanger in response to changes in the temperature of the aqueous fluid circulating through the first heat exchanger.

* * * * *